United States Patent [19]
Yasutake et al.

[11] Patent Number: 6,094,972
[45] Date of Patent: Aug. 1, 2000

[54] SAMPLING SCANNING PROBE MICROSCOPE AND SAMPLING METHOD THEREOF

[75] Inventors: Masatoshi Yasutake; Akira Inoue; Fumiki Sakai; Kazutoshi Watanabe; Tatsuya Miyatani, all of Chiba, Japan

[73] Assignee: Seiko Instruments Inc., Japan

[21] Appl. No.: 09/123,146

[22] Filed: Jul. 27, 1998

[30] Foreign Application Priority Data

Jul. 28, 1997 [JP] Japan ................................ 9-201901

[51] Int. Cl.[7] ................................ G01B 5/28; G01B 7/34
[52] U.S. Cl. ................................................................ 73/105
[58] Field of Search ............................ 73/105; 250/306, 250/307

[56] References Cited

U.S. PATENT DOCUMENTS

| | | | |
|---|---|---|---|
| 5,467,642 | 11/1995 | Hosaka et al. | 73/105 |
| 5,652,377 | 7/1997 | Yagi | 73/105 |

*Primary Examiner*—Daniel S. Larkin
*Attorney, Agent, or Firm*—Adams & Wilks

[57] ABSTRACT

An xy scanning unit produces a scanning signal along an x-direction and a scanning signal along a y-direction, which are determined by a contour of a sample to be monitored, scanning time of the x-direction, and a pixel number of the x-direction, supplied from a CPU. Then, the xy scanning unit outputs these scanning signals along the x-direction and the y-direction to a piezoelectric scanning apparatus. On the other hand, a second oscillator outputs a sine wave signal having a frequency determined by the scanning time of the x-direction and the pixel number of the x-direction to a second piezoelectric plate. A sample/hold circuit holds observation data of a probe at such timing after preselected time has passed since the output of the second oscillator becomes maximum, and then outputs the held observation data to a differential amplifier and a P.I control system. An output signal Q of the P.I control system is applied to a z-fine-moving electrode of the piezoelectric scanning apparatus, and also is converted into a digital signal by an A/D converter. This digital signal is stored into a memory in a sampling manner.

21 Claims, 10 Drawing Sheets

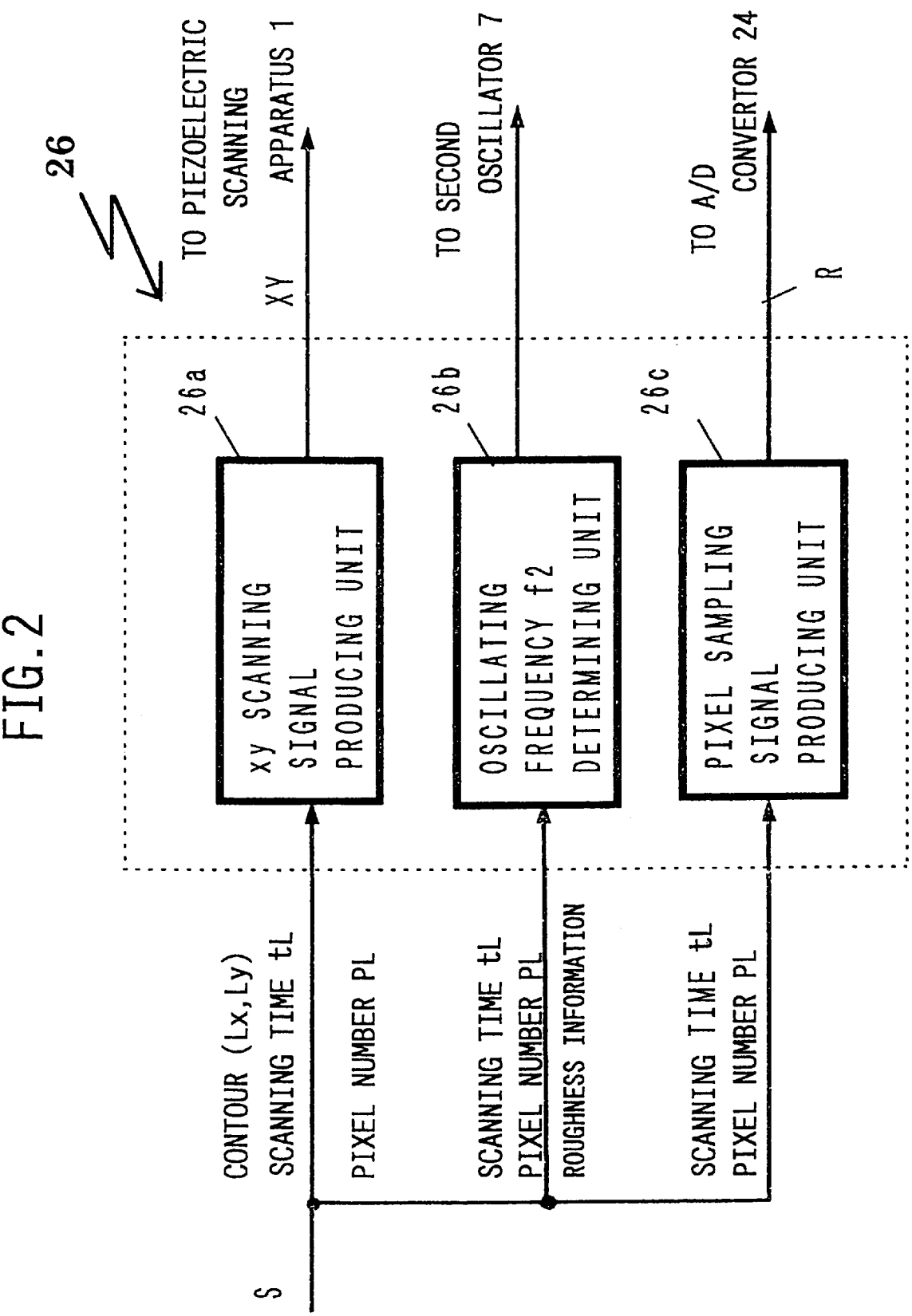

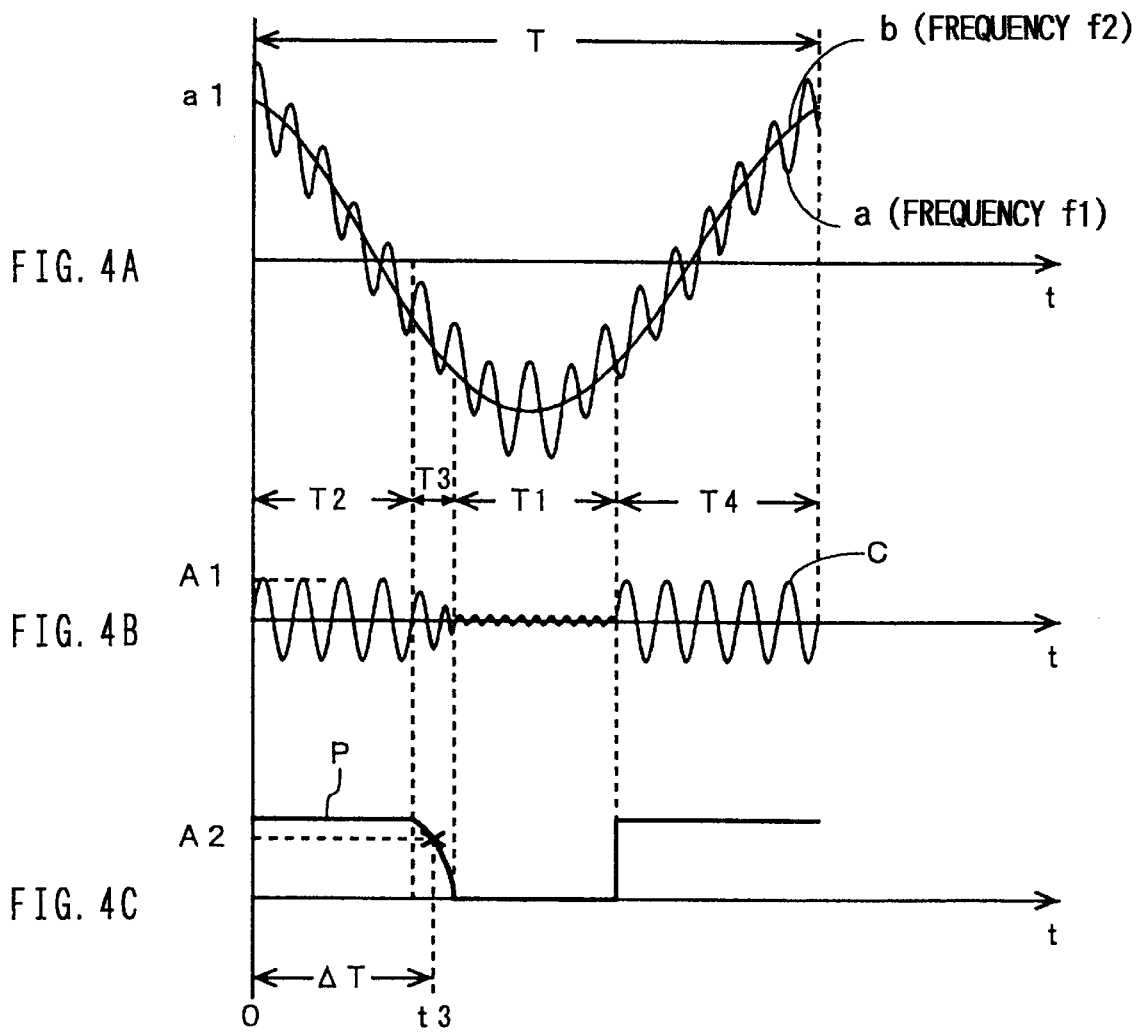

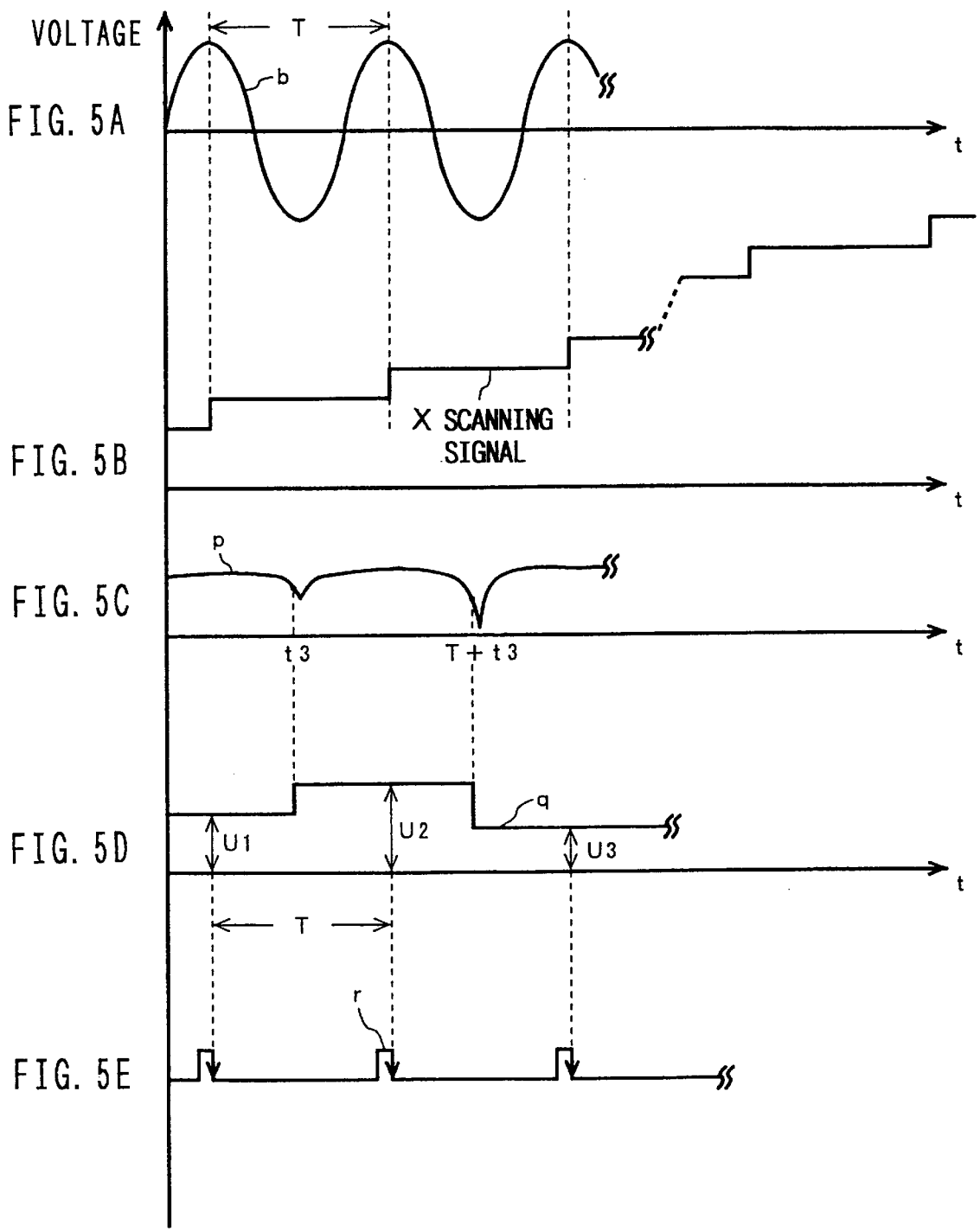

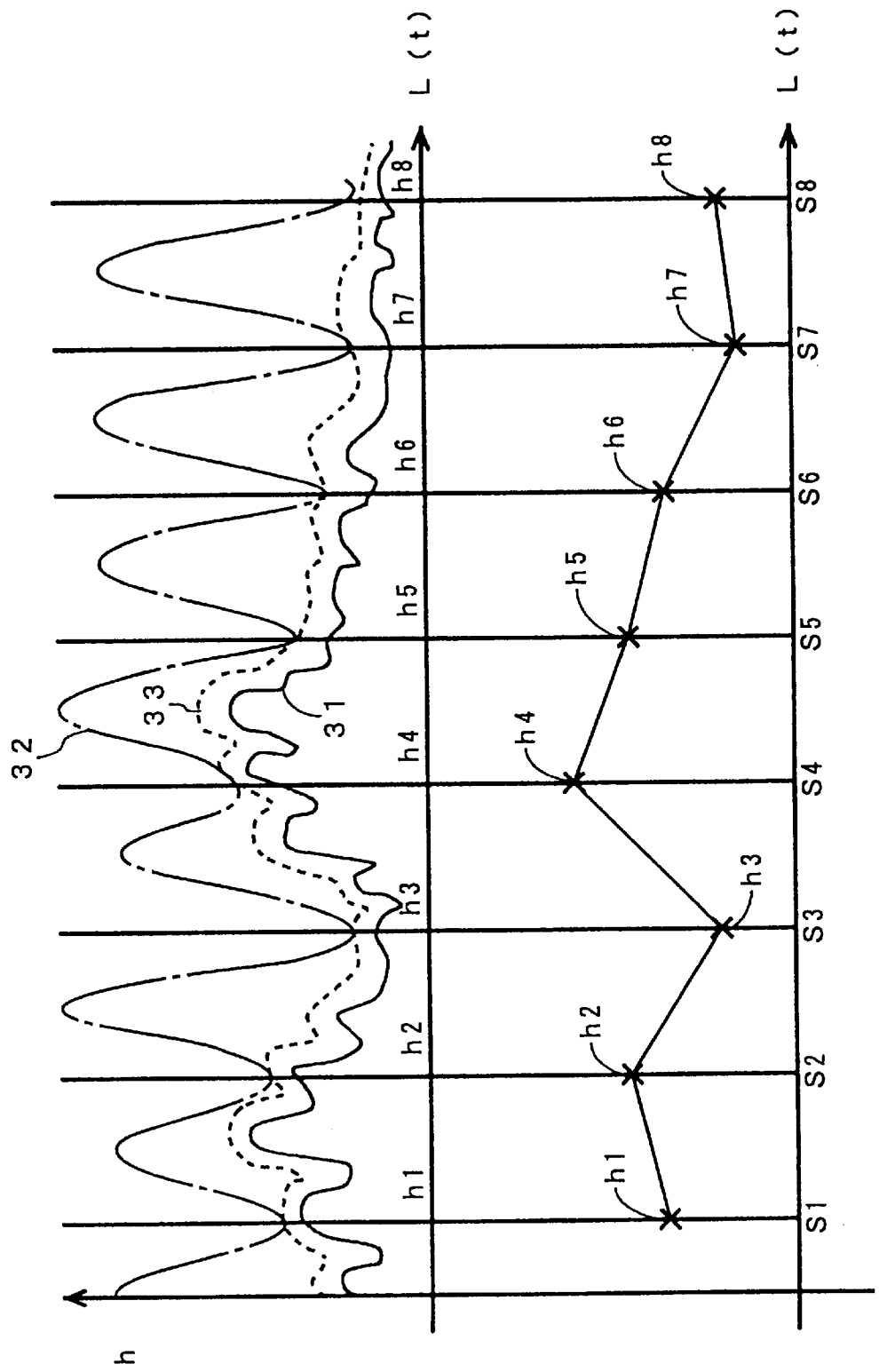

SAMPLING SCANNING PROBE MICROSCOPE AND SAMPLING METHOD THEREOF

BACKGROUND OF THE INVENTION

The present invention relates to a sampling scanning probe microscope, and more specifically, is directed to a sampling scanning probe microscope in which a cantilever is reciprocated along upper/lower directions on a surface of a sample, so that shape information and physical information about the sample surface can be obtained.

As a method for observing a shape and a physical characteristic of a sample surface by employment of the conventional scanning probe microscope, there are a contact mode and a tapping mode. The contact mode is well known in the field. For example, in this contact mode, as shown in FIG. 9, a probe 62 provided on a tip portion of a cantilever 61 is brought in contact with a surface of a sample 60 so as to scan the surface of the sample 60. At this time, deflection of the cantilever 61 is detected by detecting deviation of reflection of laser light 63 irradiated on one point of a rear portion of the cantilever 61 by using the four-split electrode 64. A feedback signal is produced by a circuit (not shown) from the sensing signal output by the four-split electrode 64. This feedback signal is applied to a piezoelectric electrode (not shown) for moving a sample base 65 in a fine mode along the upper/lower directions. As a result, such a control operation is carried out. That is, the sample surface is continuously traced by the probe 62. When this feedback signal is sampled plural times equal to the pixel number and then the sampled feedback signals are entered into the image display apparatus, the shape of the surface of the sample 60 can be imaged.

On the other hand, in the tapping mode, as represented in FIG. 10A, for example, a piezoelectric plate 70 is fixed on an end of the cantilever 61, which is located opposite to the probe 62. As indicated in FIG. 10B, an electric signal having a resonant frequency (e.g., 100 KHz) of the cantilever 61 is supplied by an oscillator 71 to the piezoelectric plate 70. Then, the probe 62 of this cantilever 61 continuously taps the surface of the sample 60. The feedback control is carried out by using the piezoelectric element of the sample base 65 in such a manner that an attenuation amount of this amplitude becomes constant. The feedback signal is sampled plural times equal to the pixel number and then the sampled feedback signals are supplied to an image display apparatus, so that the shape of the sample surface is displayed on this image display apparatus.

FIG. 11 schematically illustrates an enlarged diagram of the sample width "s" of FIG. 10A, and the tapping positions of the probe 62. In this drawing, symbol "a" shows a contour of a sample surface, and the respective points "b" represent a trail of a trace of the probe in the probe tapping mode. A time period of this tapping is set to, for example, $1/10^5$ seconds.

However, the above-described conventional techniques have the following problems. That is, in the contact mode, since the probe 62 is continuously in contact with the sample 60, the depression force having the magnitude of on the order of, for example, 10 to 100 nN (nanonewton) is continuously exerted on the surface of the sample 60. At the same time, since the probe 62 is scanned, a force along the transverse direction of the scanning direction is applied. As a consequence, there are problems in that the surface of the sample 60 is readily damaged, and the needle tip of the probe 62 is easily abraded, resulting in a short lifetime thereof.

On the other hand, in the tapping mode, since the surface of the sample 60 is continuously tapped by the probe in the resonant frequency of the cantilever 61, for example, when this resonant frequency is selected to be 100 KHz, the sample surface is continuously tapped by the probe $10^5$ times per second. As a result, there is another problem in that the surface of the sample 60 is readily damaged.

Also, there is the below-mentioned common problem in the contact mode and the tapping mode. That is, normally speaking, approximately 512 pixels, or 1,000 pixels per 1 second are employed as the number of pixels used in the above-described image display apparatus. However, as to the surface information of the sample 60 acquired in both the contact mode and the tapping mode, a substantially infinite number of pixels is employed in the contact mode, and approximately $10^5$ pixels are employed in the tapping mode, which is considerably larger than the above-described pixel number of pixels. In other words, a large number of useless pixel information is discarded. Even when such discarded pixel information is acquired, there is a problem in that since the probe 62 continuously depresses, or taps the surface of the sample 60, the sample 60 is damaged. Also, the trace speed of the probe on the sample surface depends upon the scanned width of the sample. Therefore, there is a further problem in that the wider the scanned width of this sample is widened, the slower the scanning speed is decreased.

An object of the present invention is to solve the above-described problems of the prior art, and is to provide a sampling scanning probe microscope capable of reducing a damage to a sample, and further capable of extending the lifetime of a probe. Another object of the present invention is to provide a sampling scanning probe microscope capable of making a scanning speed constant irrespective of a scanned width of a sample.

SUMMARY OF THE INVENTION

To achieve the above-explained object, the present invention is featured by a sampling scanning probe microscope equipped with a probe capable of relatively performing scanning operations along an x-direction and a y-direction in parallel to a surface of a sample, and also a moving operation along a z-direction perpendicular to the sample surface with respect to the sample surface, this sampling scanning probe microscope is comprised of: means for producing a scanning signal along an x-direction, which is determined by at least a contour of a sample to be observed, scanning time along the x-direction, and a number of along the x-direction; means for moving the probe along a z-direction in a second frequency determined by at least the scanning time along the x-direction and the number of pixels along the x-direction; means for sampling and holding monitoring data at a time instant when the probe is approached, or is made in contact with the sample surface; and means for acquiring the monitoring data sampled/held by the sampling/holding means at predetermined timing.

In accordance with the present invention, the times when the probe taps the sample surface can be greatly reduced, as compared with those of the conventional tapping mode, and furthermore it is possible to acquire such observation data having better image qualities substantially equal to those acquired in the tapping mode. Also, even when a size of a contour of a sample under observation is increased, there is no need to increase the scanning speed of the sample, so that the scanning probe microscope with better operability can be provided.

BRIEF DESCRIPTION OF THE DRAWINGS

FIG. 2 is a block diagram for showing a function of an xy scanning unit of FIG. 1.

FIGS. 4A–4C are waveforms charts for representing movement of a probe and observation data.

FIGS. 5A–5E are diagrams for representing waveforms of signals in major portions of FIG. 1.

FIG. 6 is a tapping position of a probe according to this embodiment, and the tapping position of the conventional tapping mode.

DETAILED DESCRIPTION OF THE INVENTION

Figure 1:
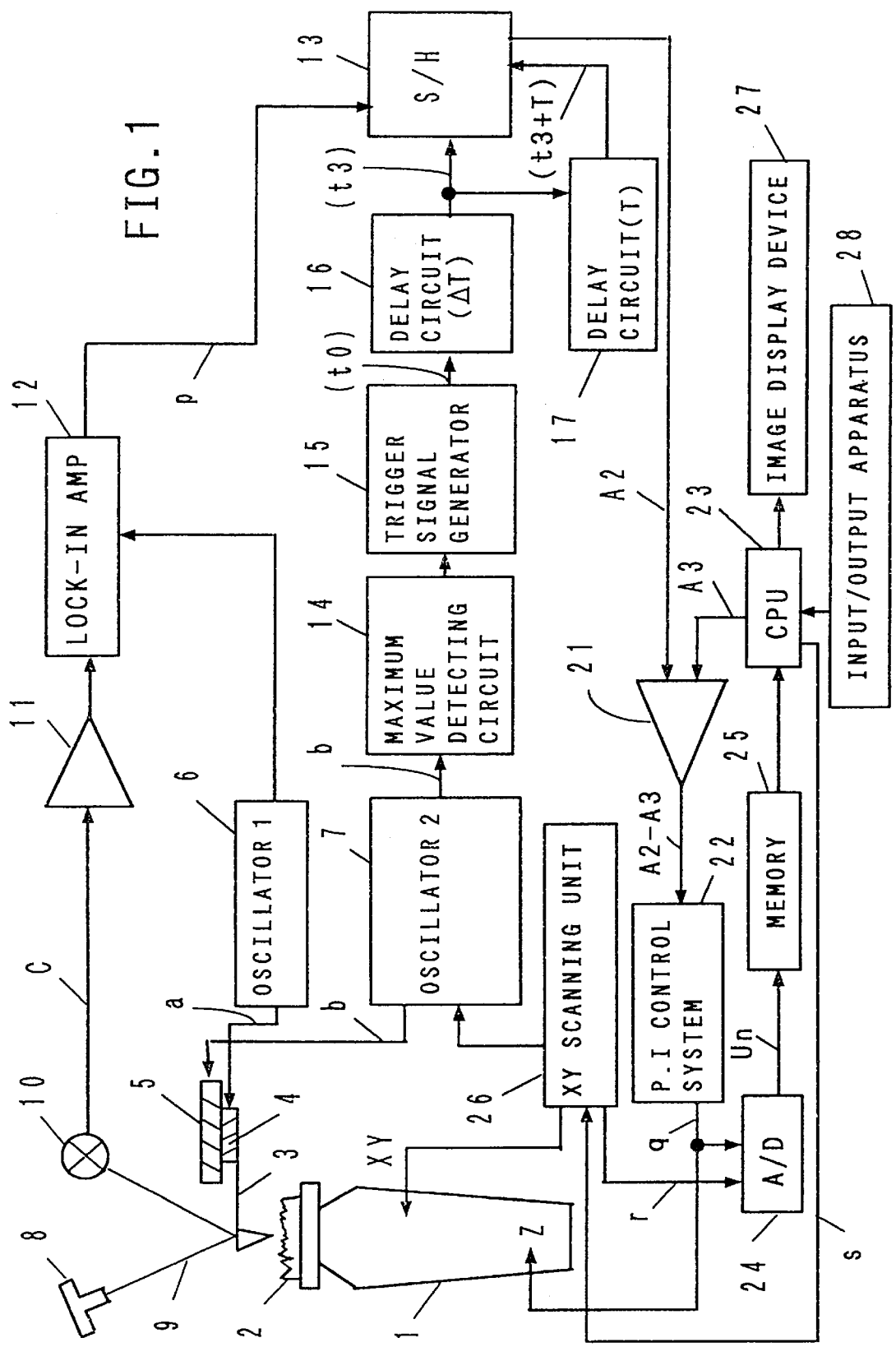
FIG. 1 is a block diagram for indicating an arrangement of one embodiment of the present invention.

Referring now to drawings, the present invention will be described in detail. FIG. 1 is a schematic block diagram for indicating an arrangement of an embodiment of the present invention.

In this drawing, reference numeral 1 shows a piezoelectric scanning apparatus in which an electrode used for a z-fine-moving operation, four-split electrodes (not shown) for an x-scanning operation, and a y-scanning operation are provided on a cylindrical surface of a cylindrical piezoelectric element. A sample 2 to be monitored is mounted on an upper surface of this piezoelectric scanning apparatus 1. Above this sample 2, a cantilever 3 having a probe located opposite to this sample 2 is provided. A first piezoelectric plate 4 and a second piezoelectric plate 5 are stacked to be fixed on one end of the cantilever 3. A signal "a" having such a frequency (for instance, 100 KHz) capable of resonating, or forcibly vibrating this cantilever 3 is supplied to the first piezoelectric plate 4 from a first oscillator 6, whereas another signal "b" oscillated from a second oscillator 7 is supplied to the second piezoelectric plates, and the second oscillator 7 produces a frequency, depending upon a control signal from an xy scanning unit 26.

A distortion amount of the above-described cantilever 3 is detected by measuring an incident position of laser light 9 outputted from a laser generator 8 by a position detector 10. The position detector 10 is constructed by, for instance, a four-split optical detecting electrode. This position detector 10 is positioned in such a manner that when the distortion amount of the cantilever 3 becomes zero, the spot of the laser light 9 is located at a center of the four-split electrodes. As a result, when distortion occurs in the cantilever 3, the spot of the laser light 9 is moved on the four-split electrodes, and then a difference is produced in voltages outputted from the four-split electrodes. This voltage difference signal "c" is amplified by an amplifier 11 to be entered into a lock-in amplifier 12. This lock-in amplifier 12 is well known in this field, and outputs either a signal produced by processing an input signal in a root-mean-square manner or a signal obtaining by rectifying an input signal in a full wave rectification.

An output "p" of this lock-in amplifier 12 is input to a sample/hold circuit 13. On the other hand, a maximum value detecting circuit 14 outputs a signal at such timing when the signal "b" outputted from the second oscillator 7 becomes maximum, and a trigger signal generator 15 produces a trigger signal having, for example, a clear rectangular waveform at the time when this signal is entered. This trigger signal is delayed by predetermined time ΔT in a delay circuit 16. At timing of a time "t3", the delayed trigger signal is entered into a set terminal of the sample/hold circuit 13. On the other hand, another delay circuit 17 further delays the signal outputted from the delay circuit 16 by time T, and thus this output signal is entered into a reset terminal of the sample/hold circuit 13 at timing of a time (t3 +T). As a result, immediately after this sample/hold circuit 13 is reset in response to the signal supplied from the delay circuit 17, this sample/hold circuit 13 samples/holds the output signal derived from the lock-in amplifier 12 in response to the signal derived from the delay circuit 16.

A differential amplifier (or error amplifier) 21 compares data A2 sampled/held by the sample/hold circuit 13 with a cantilever displacement set signal A3 supplied from a control apparatus which (will be referred to as a "CPU" hereinafter) 23, and then supplies a difference signal (A2-A3) to a proportional integral (P.I) control system 22. The P.I control system 22 outputs a signal "q" produced by synthesizing this difference signal with the integral value thereof, and then supplies this output signal to the z-fine-moving electrode of the piezoelectric scanning apparatus 1, and also enters this output signal as an observation image signal to an A/D converter 24. The A/D converter 24 executes the A/D converting operation when a pixel number sampling signal sent from the xy scanning unit 26 is inputted thereinto, and sends out the converted digital signal to a memory 25. The CPU 23 reads data saved in this memory 25 to convert the read data into image display data, and then supplies this image display data to an image display device 27. The image display device 27 displays a surface shape of the sample 2. An input/output apparatus 28 is a man-to-machine interface including a pointing device. An operator enters via this input/output apparatus 28, a scanning region of the sample 2, a contour (size of image), scanning time per line of a scanning line, a pixel number per line of the scanning line, a total scanning line number per screen, a coarse degree of a sample surface, and the like. It should be noted that generally speaking, since a name of a sample to be monitored is known in advance, an operator predicts a coarse degree of a sample surface from this sample name, and can enter via the input/output apparatus 28, for instance, "very coarse", "coarse", "slightly smooth", and "smooth".

Next, a description will now be made of a function of the above-described xy scanning unit 26. As indicated in FIG. 2, the xy scanning unit 26 is arranged by an xy scanning signal producing unit 26a, an oscillating frequency f2 determining unit 26b, and a pixel sampling signal producing unit 26c. An xy scanning control signal "s" is supplied from the CPU 23 to the xy scanning unit 26, and this xy scanning control signal "s" includes at least contours (size of image) Lx, Ly; scanning time tL per line of a scanning line; and also a pixel number PL per line of the scanning line.

Figure 3A:
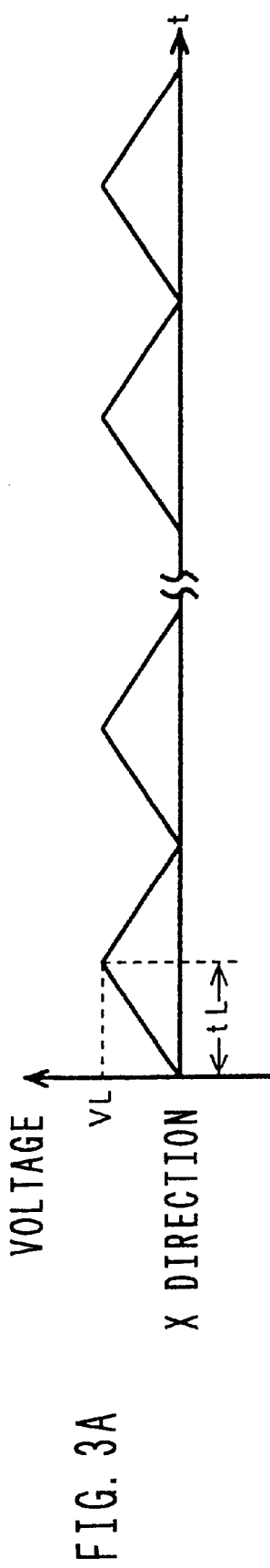
FIGS. 3A–3C are waveforms charts for showing an example of an xy scanning signal.
Figure 3B:
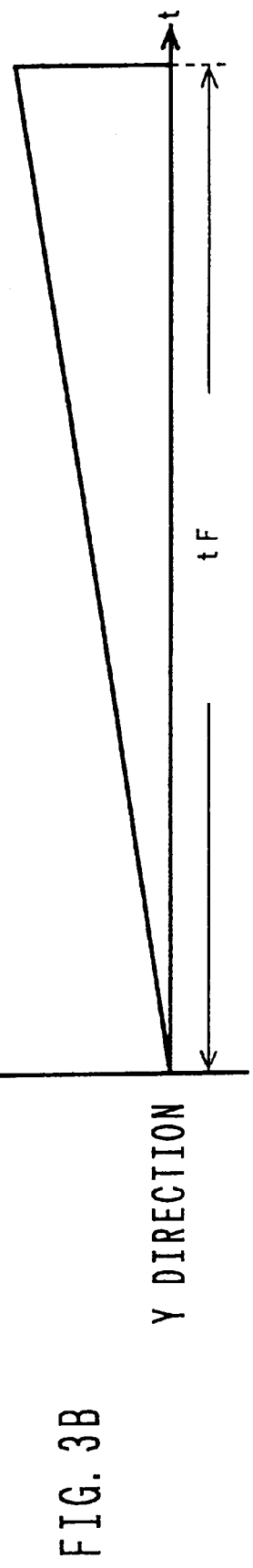

Based upon the contours (Lx×Ly), the scanning time tL, and the pixel number PL contained in this xy scanning control signal "s", the xy scanning signal producing unit 26a produces an x-direction scanning signal as indicated in FIG. 3A, and also produces a y-direction scanning signal as represented in FIG. 3B, and outputs these x-direction and y-direction scanning signals to the piezoelectric scanning apparatus 1. A time "tF" indicates scanning time of one contour (Lx×Ly)

Figure 3C:
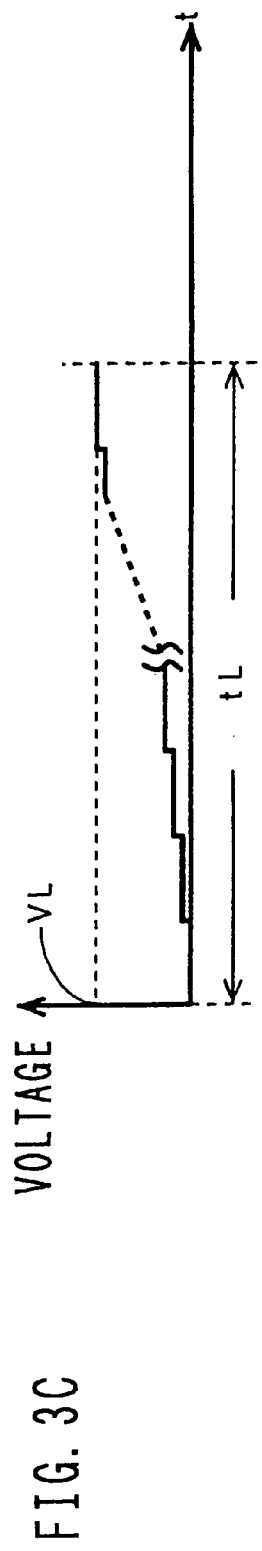

A maximum amplitude VL of the x-direction scanning signal shown in FIG. 3A is determined by the above-explained contour Lx, and the scanning time tL of one scanning line is determined as such a time that the amplitude of this x-direction scanning signal becomes the maximum amplitude VL. It should be noted that a time period during which the x-direction scanning signal is inclined along a lower right direction corresponds to a flyback period, and this flyback period is blanked. FIG. 3C represents a waveform of the x-direction scanning signal in detail from time 0 to time tL. This waveform has a stepwise shape. Then, a step number of this stepwise waveform is determined based upon the pixel number PL per line of the scanning line.

The oscillating frequency f2 determining unit 26b of FIG. 2 determines the frequency f2 of the second oscillator 7 based upon the scanning time tL of one line and the pixel number PL of 1 line, which are received from the CPU 23, in accordance with the below-mentioned formula:

$$f2 = n \cdot 1/tL/PL = n \cdot PL/tL \qquad (1)$$

In this formula, n=1, 2, 3, - - - . "n" is determined by the CPU 23 based upon the contour (size of image) Lx, Ly and the roughness information of the sample surface, which are entered from the input/output apparatus 28. For instance, in such a case that the scanning region is narrow and the surface of the sample is gradually changed, n=1, or 2 is employed. In the case that the scanning region is wide and the surface of the sample is greatly changed, n=3 to 5 is employed. Assuming now that n=3 to 5, the time when the probe approaches, or is made in contact with the surface of the sample 2 becomes three to five times larger than that when n=1. As a result, the monitor data of the sample surface detected by the probe may have a better quality. It should also be noted that when, for example, a VOC (voltage-controlled oscillator) is used as the second oscillator 7, the oscillating frequency f2 determining unit 26b outputs such a voltage substantially equal to the determined frequency f2 to this second oscillator 7.

Also, the pixel sampling signal producing unit 26c produces a sampling signal "r" having a time interval (=tL/PL) defined by dividing the scanning time tL of one line by the pixel number PL of one line, and then sends out this sampling signal "r" to the A/D converter 24.

Next, operations of this embodiment including the above-determined arrangement will now be explained. The first oscillator 6 outputs a sine wave signal "a" having a first frequency f1 and an amplitude A1, whereas the second oscillator 7 outputs a sine wave signal "b" having a second frequency f2 (time period T) and an amplitude a1 (note that f1>f2). As this first frequency f1, it is preferable to select such a frequency substantially equal to the resonant frequency of the cantilever 3. Also, the above-described amplitudes A1 and a1 are preferably selected to be: 1 nm≦A1≦500 nm, and 10 nm≦a1≦3,000 nm.

Assuming now that when the probe provided on the tip portion of the cantilever 3 is located at such a position where this probe is not made in contact with the sample 2, two sets of the above-described sine wave signals "a" and "b" are applied to the first piezoelectric plate 4 and the second piezoelectric plate 5, as represented in FIG. 4A, the probe of the cantilever 3 is largely moved under the conditions of the second frequency f2 and the amplitude a1, during which this probe of the cantilever is vibrated in the fine mode with the first frequency f1 and also the amplitude A1.

However, when the cantilever 3 is set in such a way that this cantilever 3 is made in contact with the surface of the sample 2 in the time period T1 during which the probe is lowered, a waveform of a signal "c" outputted from the four-split electrode 10 is indicated in FIG. 4B. In other words, in the time period T2 during which the probe is located above the sample 2, the four-split electrode 10 outputs a sine wave signal having a first frequency f1 and amplitude A1 similar to the above-described first oscillator 6. Within the time period T3, the probe starts to be made in contact to the surface of the sample 2, and thereafter is gradually and deeply made in contact with this sample surface. As a result, the amplitude of the signal outputted from the four-split electrode 10 is gradually decreased, and then this amplitude becomes very small at the end of this time period T3. Then, since the probe depresses the surface of the sample 2 during the time period T1, the amplitude of the signal outputted from the four-split electrode 10 becomes substantially zero. When the time period T1 has passed and the time period is entered into a time period T4, since the probe is separated from the surface of the sample 2, this four-split electrode 10 outputs again a similar signal to the signal outputted during the time period T2.

The signal "c" shown in FIG. 4B is amplified by the amplifier 11 of FIG. 1, and then the amplified signal "c" is entered into the lock-in amplifier 12. A waveform P of an output signal from the lock-in amplifier 12 is represented in FIG. 4C. That is, the lock-in amplifier 12 outputs such an output signal equal to the root-mean-squared input signal. When this root-mean-squared value becomes a very small amplitude smaller than a threshold value, this output signal becomes substantially zero. This output signal is entered into the sample/hold circuit 13.

The signal "b" of the second oscillator 7 is entered into the maximum value detecting circuit 14, and when the maximum value is detected, this maximum value detecting circuit 14 outputs a detection signal. In response to this detection signal, the trigger signal generator 15 outputs a waveform-shaped rectangular signal, and the sample/hold circuit 13 is set at timing t3 delayed by the time ΔT in the delay circuit 16. As a result, the amplitude A2 appearing at a time instant "t3" of FIG. 4C is held by the sample/hold circuit 13. It should be noted that this sample/hold circuit 13 is reset after the time T of one time period in response to the output signal derived from the delay circuit 17.

The output data A2 from the sample/hold circuit 13 is inputted to the differential amplifier 21. This differential amplifier 21 compares the output data A2 of the sample/hold circuit 13 with the cantilever displacement set signal A3 supplied from the CPU 23, and then outputs a difference signal (A2−A3) to the P.I control system 22. The P.I control system 22 synthesizes this difference signal with the integral signal thereof to produce a signal "q", and supplies this signal "q" to the z-fine-moving electrode of the piezoelectric scanning apparatus 1, and also to the A/D converter 24. On the other hand, since the pixel sampling signal "r" produced from the pixel sampling signal producing unit 26c is entered into the A/D converter 24 so as to initiate this A/D converter 24, this A/D converter 24 is operated in such a time interval (=tL/PL) defined by dividing the scanning time tL of one line by the pixel number PL of the one line. Then, the converted digital signal Un is stored into the memory 25. Alternatively, while the A/D converter 24 is continuously operated, the pixel sampling signal "r" may be supplied to the memory 25, and this memory 25 may store thereinto the input data in the time interval (=tL/PL).

FIGS. 5A–5E are waveforms charts for indicating a portion of the above-described operation. FIG. 5A is a waveform chart of the output signal "b" of the second oscillator 7. FIG. 5B is a detailed waveform of the x scanning signal outputted from the xy scanning unit 26. FIG. 5C is a waveform chart of the output signal "p" of the lock-in amplifier 12. FIG. 5D is a waveform chart of the output signal "q" of the P.I control system 22, and another waveform chart of the output signal Un of the A/D converter 24. FIG. 5E shows the pixel sampling signal "r". The data stored in the memory 25 are such digitalized data U1, U2, U3, - - -, Un as shown in FIG. 5D.

FIG. 6 represents sampling points S1 to S8 of data on the surface of the sample 2, and data h1 to h8 acquired from the respective sampling points S1 to S8, according to this embodiment. In this drawing, reference numeral 31 shows a shape of a portion on the surface of the sample 2, reference numeral 32 indicates a trail of the probe according to this embodiment, and reference numeral 33 shows the trail of the probe in the conventional tapping mode. It should be understood that this drawing indicates such a case that n=1 in the above-explained formula (1). As apparent from the trail 32 shown in this drawing, a time period during which the probe taps the surface 31 of the sample 2 is considerably shorter than the time period during which the probe taps the sample surface in the conventional tapping mode, as indicated in the trail 33, and scanning speed is also fast. It should also be noted that although only eight pieces of the sampling points S1 to S8 and the data h1 to h8 are indicated, normally the total pixel number of one scanning line, namely 512 pieces, or 1024 pieces of points/data are apparently indicated.

As previously described, in accordance with this embodiment mode, the frequency f2 of the second oscillator 7 is determined based upon the scanning time tL of one line and the pixel number PL of one line, and the surface data of the sample 2 is acquired only once at the proper timing within 1 time period of the signal "b" outputted from the second oscillator 7. As a consequence, the times when the probe taps the sample surface can be greatly reduced, as compared with that of the conventional tapping mode, and further damage to the sample can be avoided. Also, even when the scanned width of the sample under observation is widened, there is such a merit that the scanning speed can be made constant irrespective of this widened scanning width.

Figure 7:
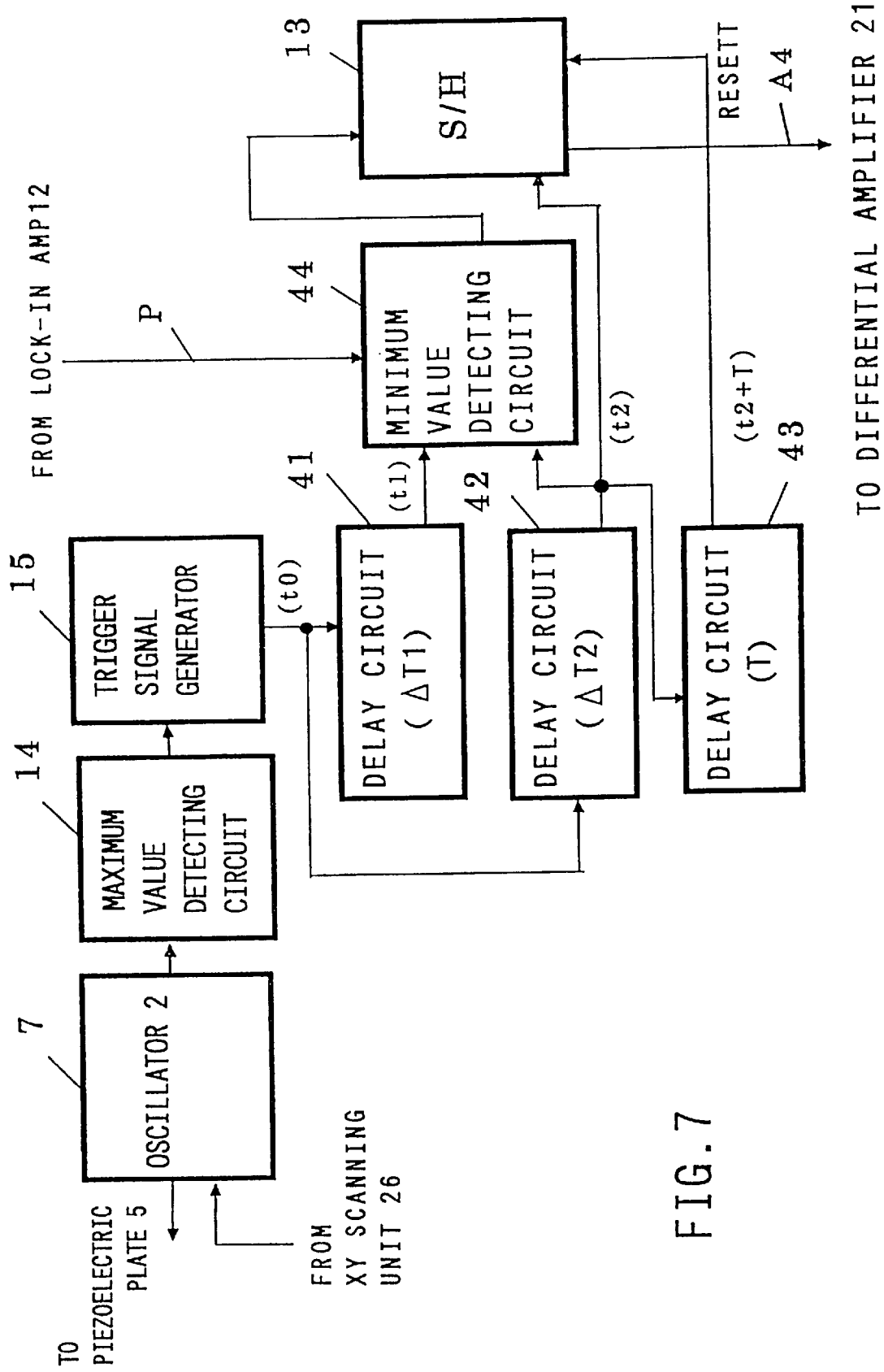
FIG. 7 is a block diagram for indicating an arrangement of a major portion of a second embodiment of the present invention.
Figure 8:
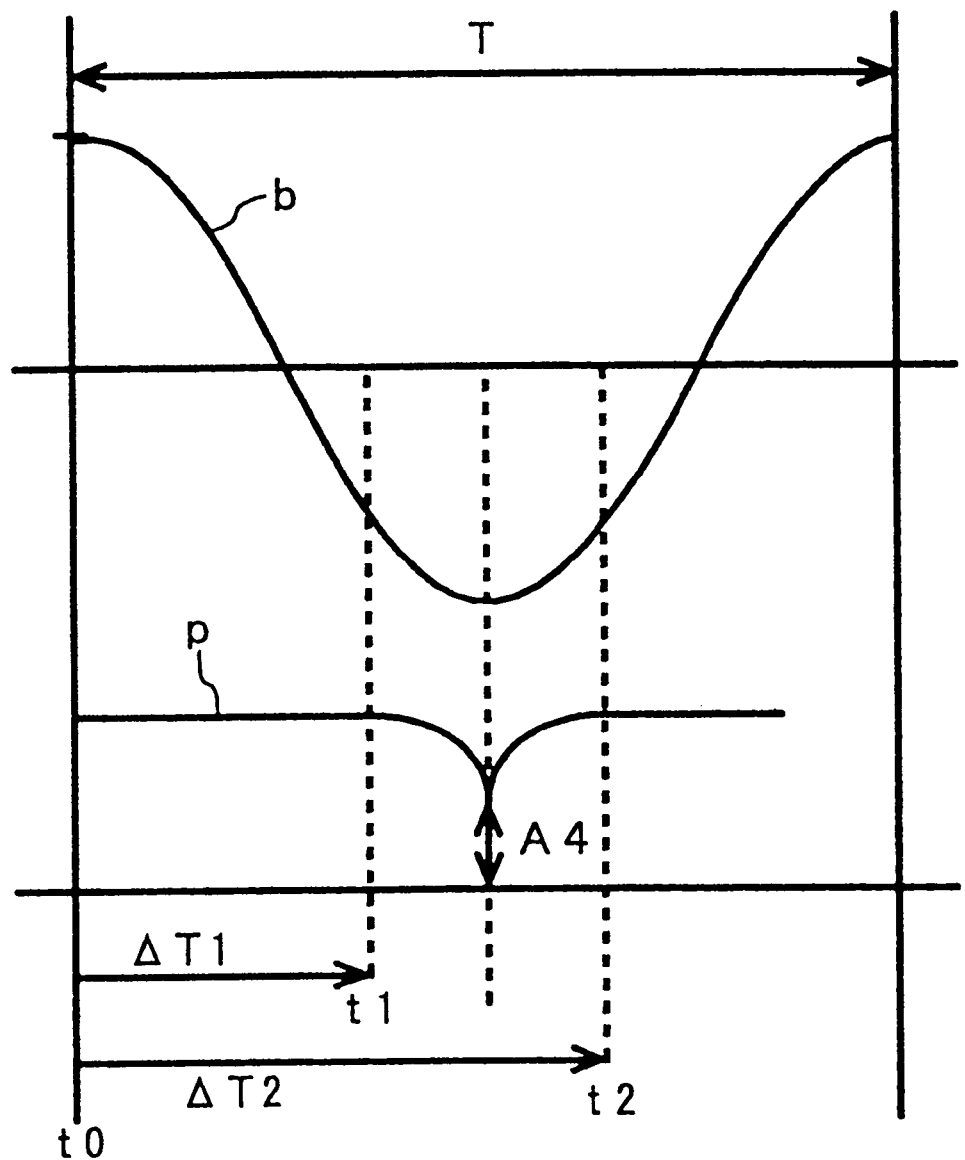
FIG. 8 is an explanatory diagram for explaining data sampled by the second embodiment.
Figure 9:
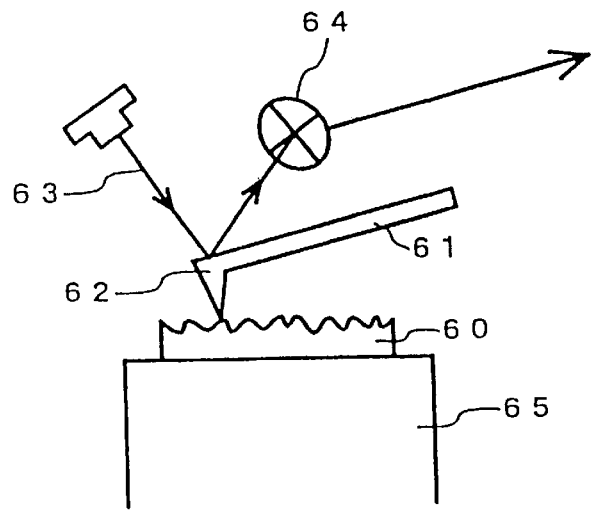
FIG. 9 is an explanatory diagram for explaining the major portion of the conventional contact mode.
Figure 10A:
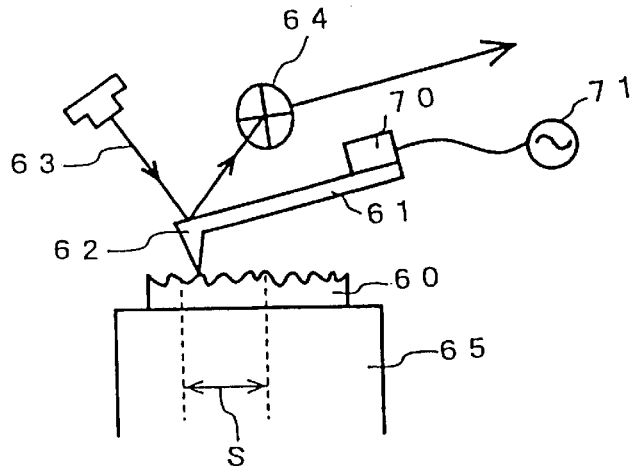
FIGS. 10A–10B are explanatory diagrams for explaining the major portion of the conventional tapping mode.
Figure 10B:
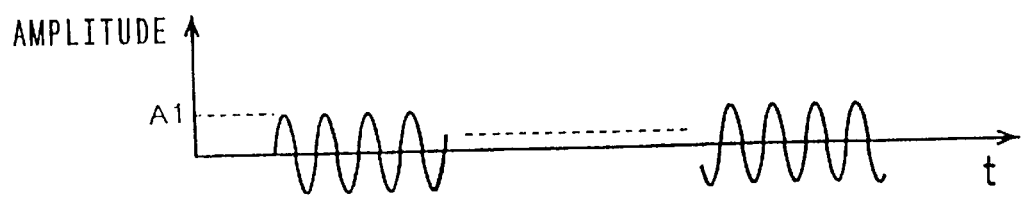
Figure 11:
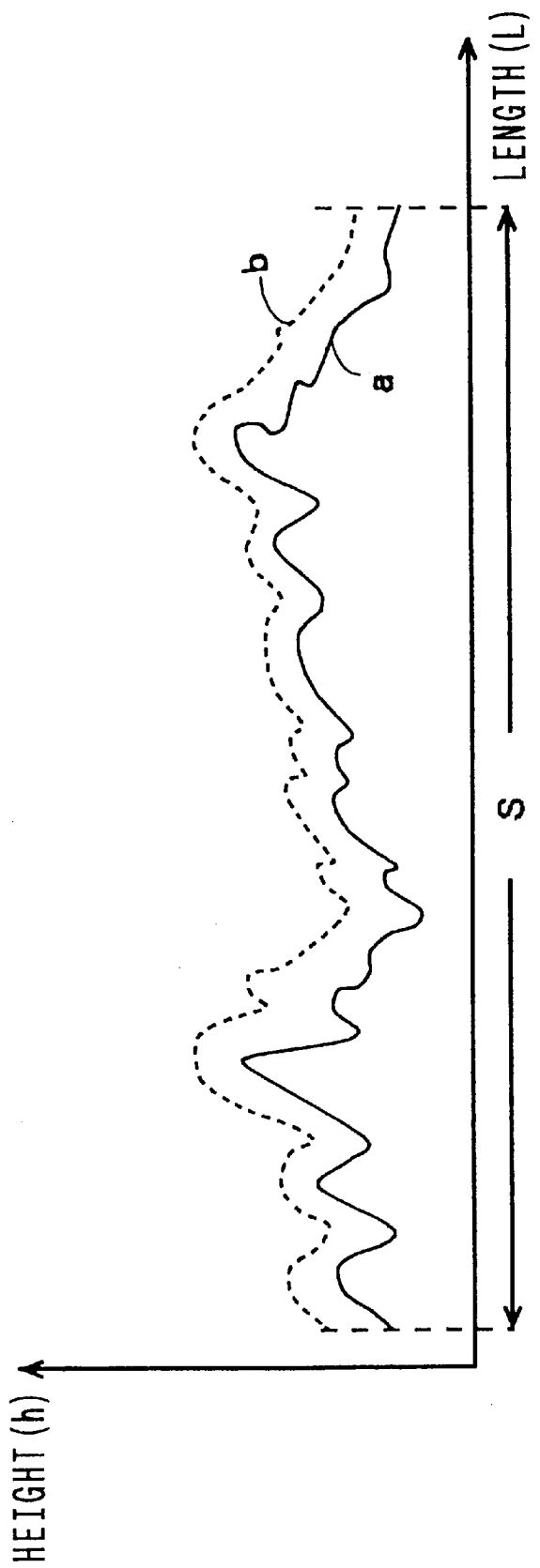
FIG. 11 is a tapping position in the conventional tapping mode.

Referring now to FIG. 7 and FIG. 8, another embodiment of the present invention will be described. This embodiment owns a different point from the above-described embodiment shown in FIG. 1. That is, the peripheral circuit of the sample/hold circuit 13 shown in FIG. 1 is arranged by a first delay circuit 41 to a third delay circuit 43, and a minimum value detecting circuit 44. An output signal derived from this minimum value detecting circuit 44 is used as an input signal to this sample/hold circuit 13.

Since other arrangements of this embodiment and operations thereof are identical to those of FIG. 1, only operations of the above-described arrangements will be described with reference to FIG. 8. The maximum value detecting circuit 14 detects such timing when the output signal "b" of the second oscillator 7 becomes a maximum value, and then outputs this timing to the trigger signal generating circuit 15. Assuming now that this maximum value detecting circuit 14 detects the maximum value at a time instant "t0" of FIG. 5, the trigger signal generating circuit 15 outputs a clear rectangular trigger signal at timing "t0". This trigger signal is entered into the first and second delay circuits 41 and 42. Then, the respective delay circuits 41 and 42 output a signal "t1", and a signal "t2", respectively. This signal "t1" corresponds to a signal delayed from the time instant "t0" by T1, and the signal "t2" corresponds to a signal delayed from the time instant "t1" by T2. The minimum value detecting circuit 44 detects a minimum value of the output signal (A4 of FIG. 8) derived from the lock-in amplifier 12 between the time instant t1 and the time instant t2. This minimum value A4 is entered into the sample/hold circuit 13 so as to be held in response to the timing signal t2 outputted from the second delay circuit 42. On the other hand, the data A4 held by this sample/hold circuit 13 is reset in response to another timing signal (t2+T) outputted from the third delay circuit 43.

As previously described, according to this embodiment, the minimum value of the output signal of the lock-in amplifier 12 is detected, and then can be supplied to the differential amplifier 21 of FIG. 1.

Although the present invention has been described with reference to the above-described preferred embodiments, the present invention is not limited to these preferred embodiments, but may be modified without departing from the technical scope and spirit of the present invention.

As apparent from the above-described explanations, in accordance with the present invention, the times when the probe taps the surface of the sample while the sample surface is observed can be greatly reduced, as compared with that of the conventional tapping system. There are such effects that the damages of the sample can be prevented, and the damages of the probe can be avoided to achieve the long lifetime of this probe. Also, since the times when this probe taps the surface of the sample can be changed in response to the coarse degrees of the sample surface, even when the surface of the sample is considerably changed, the observation data having the better qualities can be acquired.

Also, in accordance with the present invention, since the time period of the x-direction scanning signal is made constant, or substantially constant irrespective of the size of the contour, even when the size of the contour is increased, there is another effect that the better operability can be realized without changing the observation time of one screen.

What is claimed is:

1. A sampling scanning probe microscope equipped with a probe capable of relatively performing scanning operations along an x-direction and a y-direction parallel to a surface of a sample, and also a moving operation along a z-direction perpendicular to the sample surface comprising:

means for producing a scanning signal along an x-direction, which is determined by at least a contour of a sample to be observed, a scanning time along the x-direction, and a pixel number along the x-direction;

means for moving the probe along a z-direction at a second frequency determined by at least the scanning time along the x-direction and the pixel number along the x-direction;

sample/hold means for sampling and holding monitoring data at a time instant when the probe is approached to, or brought into contact with the sample surface; and means for acquiring the monitoring data sampled/held by the sample/hold means at a predetermined timing.

2. A sampling scanning probe microscope as claimed in claim 1; wherein the probe is vibrated at a first frequency and a second frequency lower than the first frequency which causes the probe to be resonated or forcibly vibrated.

3. A sampling scanning probe microscope as claimed in claim 1; wherein waveforms of the first frequency and the second frequency are at least one of sine waves and cosine waves.

4. A sampling scanning probe microscope as claimed in claim 1; wherein the sample/hold means includes means for detecting a timing when the signal having the second frequency has a maximum value, and samples/holds the monitoring data a predetermined time after the maximum value is detected.

5. A sampling scanning probe microscope as claimed in claim 1; wherein the sample/hold means includes means for detecting a timing when the signal having the second frequency has a maximum value, and samples/holds a minimum value of the monitoring data between a first predetermined time and a second predetermined after the maximum value is detected.

6. A sampling scanning probe microscope as claimed in claim 1; wherein the scanning time along the x-direction is "tL", the pixel number along the y-direction is "PL", and the second frequency "f2" at which the probe is moved along the z-direction is defined by:

f2=PL/tL.

7. A sampling scanning probe microscope as claimed in claim 1; wherein a degree of coarseness of the sample surface is used in determining the second frequency at which the probe is moved along the z-direction.

8. A sampling scanning probe microscope as claimed in claim 2; wherein waveforms of the first frequency and the second frequency are at least one of sine waves and cosine waves.

9. A sampling scanning probe microscope as claimed in claim 2; wherein the sample/hold means includes means for detecting a timing when the signal having the second frequency has a maximum value, and samples/holds the monitoring data a predetermined time after the maximum value is detected.

10. A sampling scanning probe microscope as claimed in claim 2; wherein the sample/hold means includes means for detecting a timing when the signal having the second frequency has a maximum value, and samples/holds a minimum value of the monitoring data between a first predetermined time and a second predetermined time after the maximum value is detected.

11. A sampling scanning probe microscope as claimed in claim 2; wherein the scanning time along the x-direction is "tL", the pixel number along the y-direction is "PL", and the second frequency "f2" at which the probe is moved along the z-direction is defined by:

f2=PL/tL.

12. A sampling scanning probe microscope as claimed in claim 2; wherein a degree of coarseness of the sample surface is used in for determining the second frequency at which the probe is moved along the z-direction.

13. A sampling method using a sampling scanning probe microscope equipped with a probe capable of relatively performing scanning operations along an x-direction and a y-direction parallel to a surface of a sample, and also a moving operation along a z-direction perpendicular to the sample surface, the method comprising the steps of:
producing a scanning signal along an x-direction, which is determined by at least a contour of a sample to be observed, a scanning time along the x-direction, and a pixel number along the x-direction;
moving the probe along a z-direction at a second frequency determined by at least the scanning time along the x-direction and the pixel number along the x-direction;
sampling and holding monitoring data at a time instant when said probe is approached to, or brought into contact with the sample surface; and
acquiring the sampled/held monitoring data at a predetermined timing.

14. A scanning probe microscope comprising:
a probe capable of being scanned in first and second axes across a sample surface and controlled in a third axis perpendicular to the first and second axes;
means for producing a scanning signal for moving the probe relative to a sample along one of the first and second axes, the scanning signal being determined in accordance with a contour of the sample, a time of scanning along the one axis, and a number of points along the one axis at which a measurement is to be taken;
means for moving the probe along the third axis in a periodic motion at a movement frequency determined in accordance with the time of scanning time along the one axis and the number of points along the one axis at which a measurement is to be taken;
sample/hold means for sampling and holding measurement data taken at a time instant when the probe is approaching or brought into contact with the sample surface; and
means for acquiring the measurement data sampled/held by the sample/hold means at a predetermined time.

15. A scanning probe microscope according to claim 14; wherein the means for producing a scanning signal is responsive to user input data.

16. A scanning probe microscope according to claim 15; wherein the user input data includes a degree of coarseness of the sample surface, and the user input data is used in determining the movement frequency at which the probe is moved in the third axis direction.

17. A scanning probe microscope according to claim 14; wherein the probe is vibrated at a first frequency approximately equal to the resonant frequency of the probe and is further vibrated in the third axis direction at the movement frequency, which is lower than the first frequency, so that the probe is resonated while being periodically approached toward and moved away from the sample surface.

18. A scanning probe microscope according to claim 14; wherein waveforms for vibrating the probe at the first frequency and the movement frequency comprise at least one of a sine wave and a cosine wave.

19. A scanning probe microscope according to claim 14; wherein the sample/hold means includes means for detecting a time at which the signal for moving the probe along the third axis at the movement frequency has a maximum value and samples/holds the measurement data a predetermined time after the maximum value is detected.

20. A scanning probe microscope according to claim 14; wherein the sample/hold means includes means for detecting a time at which the signal for moving the probe along the third axis at the movement frequency has a maximum value and samples/holds a minimum value of the measurement data between a first predetermined time and a second predetermined after the maximum value is detected.

21. A scanning probe microscope according to claim 14; wherein the scanning time along the first axis is "tL", the number of points at which measurements are to be taken along the second axis is "PL", and the movement frequency "f2" at which the probe is moved along the third axis is defined by f2=PL/tL.

* * * * *